US008618772B2

(12) United States Patent
Thomas et al.

(10) Patent No.: US 8,618,772 B2
(45) Date of Patent: Dec. 31, 2013

(54) TRANSPORTABLE ELECTRICAL ENERGY STORAGE SYSTEM INCLUDING ENCLOSURE WITH CHARGING AND OUTPUT CIRCUITRY CONTAINING INTERCONNECTABLE CELLS

(75) Inventors: Toby D. Thomas, Southlake, TX (US); James C. Copp, Arlington, TX (US); David L. Hoelscher, Arlington, TX (US); Lloyd K. Farris, Grand Prairie, TX (US)

(73) Assignee: Lockheed Martin Corporation, Grand Prairie, TX (US)

( * ) Notice: Subject to any disclaimer, the term of this patent is extended or adjusted under 35 U.S.C. 154(b) by 918 days.

(21) Appl. No.: 12/593,294

(22) PCT Filed: Apr. 2, 2008

(86) PCT No.: PCT/US2008/059191
§ 371 (c)(1),
(2), (4) Date: Sep. 28, 2009

(87) PCT Pub. No.: WO2009/009176
PCT Pub. Date: Jan. 15, 2009

(65) Prior Publication Data
US 2010/0117591 A1    May 13, 2010

Related U.S. Application Data

(60) Provisional application No. 60/909,873, filed on Apr. 3, 2007, provisional application No. 60/951,669, filed on Jul. 24, 2007.

(51) Int. Cl.
*H02J 7/00* (2006.01)
(52) U.S. Cl.
USPC .......................... 320/113; 320/107; 320/112

(58) Field of Classification Search
USPC ............ 429/97, 99, 123, 149, 151, 152, 157, 429/179, 96, 153, 158, 159, 160, 178; 320/107, 112, 113, 111; D13/103, 107, D13/119, 120, 121
See application file for complete search history.

(56) References Cited

U.S. PATENT DOCUMENTS

| | | | | |
|---|---|---|---|---|
| 5,104,752 A | * | 4/1992 | Baughman et al. | 429/1 |
| 5,161,094 A | * | 11/1992 | Bruder et al. | 361/502 |
| 5,378,552 A | * | 1/1995 | Dixon, Jr. | 429/91 |
| 5,792,573 A | * | 8/1998 | Pitzen et al. | 429/97 |
| 5,793,185 A | | 8/1998 | Prelec et al. | |
| 6,014,009 A | * | 1/2000 | Wierzbicki et al. | 320/107 |
| 6,172,892 B1 | * | 1/2001 | Plichta et al. | 363/146 |

(Continued)

FOREIGN PATENT DOCUMENTS

WO    WO 2006095353 A2 *    9/2006

*Primary Examiner* — M'Baye Diao
*Assistant Examiner* — Manuel Hernandez
(74) *Attorney, Agent, or Firm* — Slater & Matsil, L.L.P.

(57) ABSTRACT

A transportable electrical energy storage system includes an electrical energy storage unit, an electrical energy storage unit management system operably associated with the electrical energy storage unit, an AC/DC rectifier operably associated with the electrical energy storage unit management system, and a DC/DC converter operably associated with the electrical energy storage unit management system. The system further includes at least one bi-directional adapter operatively associated with the electrical energy storage unit and a case for protecting the electrical energy storage unit, the electrical energy storage unit management system, the AC/DC rectifier, the DC/DC converter, and the at least one bi-directional adapter.

4 Claims, 20 Drawing Sheets

(56) References Cited

U.S. PATENT DOCUMENTS

| | | |
|---|---|---|
| 6,756,764 B2 | 6/2004 | Smith et al. |
| 6,894,457 B2 * | 5/2005 | Germagian et al. .......... 320/119 |
| 7,736,773 B2 | 6/2010 | DeSorbo |
| 7,829,214 B2 * | 11/2010 | Breen et al. .................... 429/151 |
| 2003/0054240 A1 * | 3/2003 | Aronsson ...................... 429/157 |
| 2007/0046250 A1 * | 3/2007 | Freiman et al. ................ 320/101 |
| 2007/0184339 A1 * | 8/2007 | Scheucher ...................... 429/99 |
| 2009/0246616 A1 * | 10/2009 | Koyama et al. ............... 429/153 |

* cited by examiner

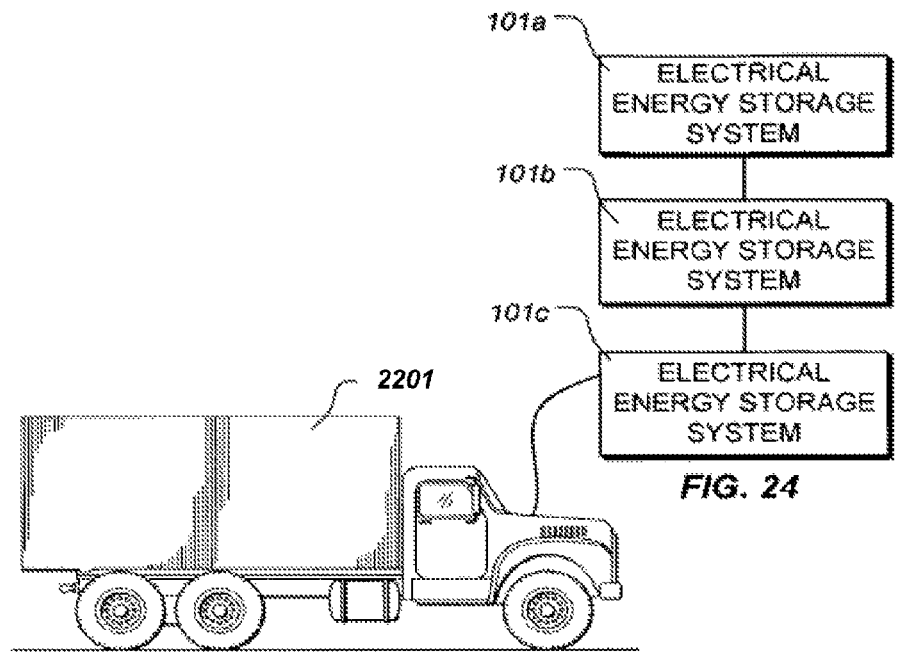
FIG. 24
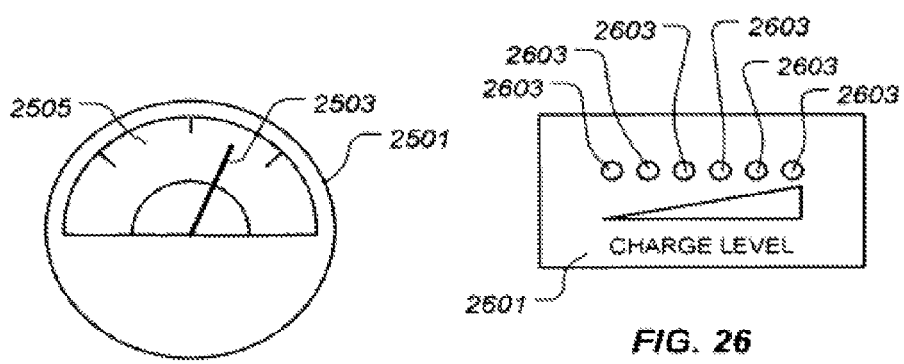
FIG. 25
FIG. 26

TRANSPORTABLE ELECTRICAL ENERGY STORAGE SYSTEM INCLUDING ENCLOSURE WITH CHARGING AND OUTPUT CIRCUITRY CONTAINING INTERCONNECTABLE CELLS

This application is a 371 of PCT/US08/59191 filed Apr. 2, 2008, which claims the benefit of U.S. Provisional Application No. 60/909,873 filed Apr. 3, 2007 and claims the benefit of 60/951,669 filed Jul. 24, 2007.

TECHNICAL FIELD

The present invention relates in general to the field of devices and systems for storing electrical energy that can be transported from place to place.

DESCRIPTION OF THE PRIOR ART

Equipment used in military and other field operations typically require electrical power to operate. A vehicle, for example, may encounter a situation wherein the vehicle's battery becomes discharged and the vehicle is no longer operational. In such situations, the non-operational vehicle can be "jumpstarted." When conventionally jumpstarting a vehicle, an operational vehicle is positioned proximate the non-operational vehicle. A pair of electrical leads is extended between the vehicles, coupling the electrical system of the failed vehicle to the electrical system of the operational vehicle. The battery and/or electricity-generating system of the operational vehicle is used to start the failed vehicle, so that the previously non-operational vehicle is now operational and the electricity generating system of the previously non-operational vehicle can recharge the previously non-operational vehicle's battery.

Problems arise, however, when no operational vehicle is available to jumpstart the non-operational vehicle. Moreover, placing two non-moving vehicles in close proximity when in military operations may pose a very hazardous environment for the vehicles and personnel using the vehicles. The non-moving vehicles and personnel using the vehicles may be easily targeted by enemy personnel.

Equipment other than vehicles also require electrical power to operate. For example, an electronic system, such as that used in warfare, may be battery powered as a convenience to the user or because the devices are used in areas where electrical power is not readily available. Small scale rechargeable batteries, however, provide limited power and restrict the useful time available before the batteries must be exchanged for freshly charged batteries. Some electrical systems may be able to use electrical power from a nearby vehicle to operate, even though the electronic system is not part of the vehicle. If no vehicle is nearby, or if the vehicle becomes non-operational, the electronic system cannot function, because the electronic system has no source of electrical power.

Engine-driven, portable generators can provide power to equipment and, in certain situations, may provide power for jumpstarting vehicles. Such generators, however, are bulky, require maintenance, and may not be light enough for personnel to hand-carry. Moreover, operating a generator creates noise that may attract the enemy's attention when in military operations.

Slave start battery systems exist that can be used to jump-start vehicles. These systems, however, are too heavy for personnel to hand carry because they employ lead-acid batteries. Moreover, such systems are recharged with specially designed chargers.

There are many ways to provide electrical power to equipment that are well known in the art; however, considerable room for improvement remains.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

FIG. 24 is a stylized view of a plurality of transportable electrical energy storage systems of FIG. 1 electrically coupled with the vehicle of FIG. 21;

FIGS. 25 and 26 are stylized, top, plan views of electric charge indicators used in particular embodiments of the transportable electrical energy storage system of FIG. 1;

Figure 1:
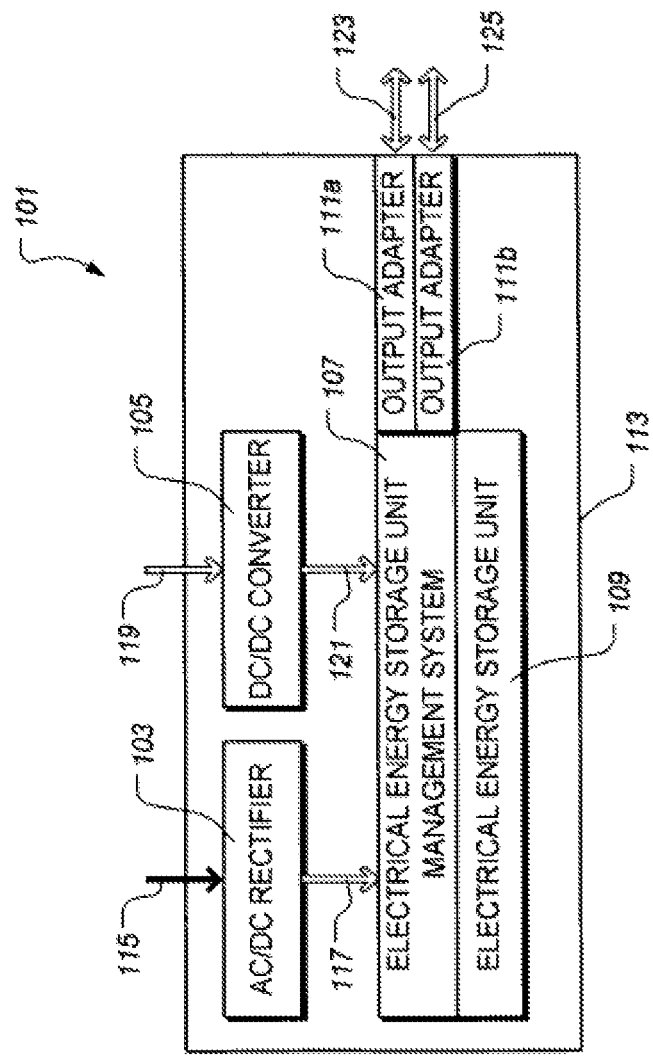
FIG. 1 is a stylized, block diagram of an illustrative embodiment of a transportable electrical energy storage system.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

A transportable electrical energy storage system comprises an electrical energy storage unit, an electrical energy storage unit management system operably associated with the electrical energy storage unit, and an AC/DC rectifier operably associated with the electrical energy storage unit management system. The electrical energy storage system further comprises a DC/DC converter operably associated with the electrical energy storage unit management system, at least one bi-directional adapter operatively associated with the electrical energy storage unit management system, and a case for protecting the electrical energy storage unit, the electrical energy storage unit management system, the AC/DC rectifier, the DC/DC converter, and the at least one bi-directional adapter.

Figure 2:
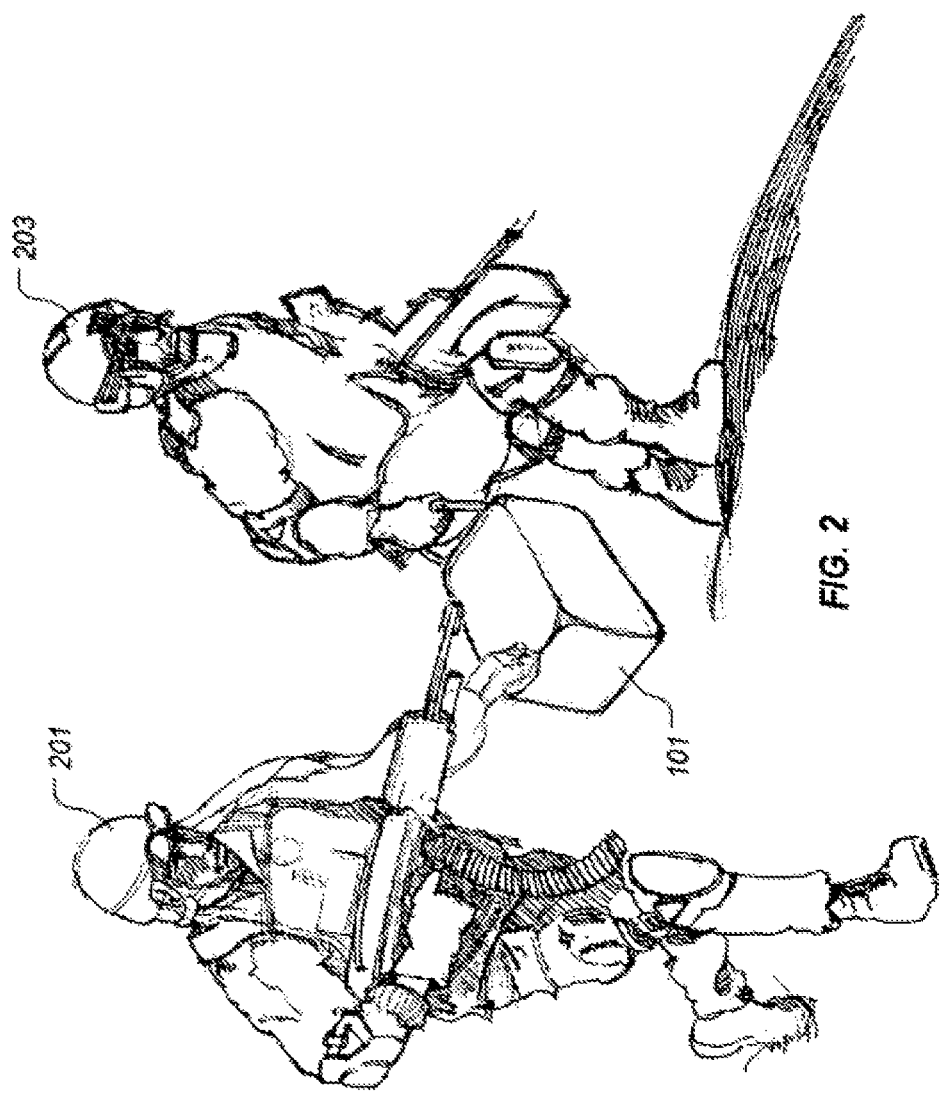
FIG. 2 is a stylized, perspective view of the transportable electrical energy storage system of FIG. 1 being carried by personnel.

FIG. 1 is a block diagram depicting one particular, illustrative embodiment of a transportable electrical energy storage system 101. Electrical energy storage system 101 includes an AC/DC rectifier 103, a DC/DC converter 105, an electrical energy storage unit management system 107, an electrical energy storage unit 109, one or more bi-directional adapters 111a and 111b, and a case 113. A weight of electrical energy storage system 101 is such that no more than two personnel, such as personnel 201 and 203 of FIG. 2, can carry electrical energy storage system 101. Preferably, electrical energy storage system 101 weighs no more than about 45 kilograms. More preferably, electrical energy storage system 101 weighs no more than about 38 kilograms. Electrical energy storage unit 109 comprises one or more rechargeable cells, as discussed in greater detail herein. Electrical energy storage unit management system 107 is operatively associated with electrical energy storage unit 109 to electrically recharge electrical energy storage unit 109 using electrical power from AC/DC rectifier 103, DC/DC converter 105, or bi-directional adapters 111a and 111b. Moreover, electrical energy storage management system 107 manages the discharge of electrical energy storage unit 109 via bi-directional adapters 111a and/or 111b.

In one embodiment, electrical energy storage unit 109 comprises one or more lithium-ion batteries; however, other types of electrical energy storage units are contemplated by the present invention. For example, electrical energy storage unit 109 may comprise one or more solid state, capacitive, electrical energy storage devices, such as those provided by EEstor, Inc. of Cedar Park, Tex., as described in U.S. Pat. No. 7,033,406 to Weir et al., which is incorporated herein by reference for all purposes. Such solid state electrical energy storage devices comprise calcined composition-modified barium titanate coated with aluminum oxide and calcium magnesium aluminosilicate glass. Electrical energy storage unit 109 may also comprise one or more nickel-cadmium cells, nickel-metal hydride cells, lithium cells, lead-acid cells, or any other type of cell suitable for the particular implementation.

Still referring to FIG. 1, AC/DC rectifier 103 rectifies electrical power exhibiting an alternating current, represented by a solid arrow 115, to electrical power exhibiting direct current, represented by an outlined arrow 117, that exhibits characteristics, e.g., current, voltage, etc., appropriate for electrical energy storage unit management system 107. For example, one particular embodiment of AC/DC rectifier 103 converts alternating current electrical power to direct current electrical power exhibiting a voltage of about 24 volts and has a power capacity of about two kilowatts. Direct current 117 is supplied to electrical energy storage unit management system 107 to recharge electrical energy storage unit 109. Moreover, AC/DC rectifier 103 senses and adapts to particular characteristics, such as voltage, frequency, current, and the like, of various types of alternating current electrical power. Preferably, AC/DC rectifier 103 accepts single phase, alternating current electrical power exhibiting voltages within a range of about 50 volts to about 300 volts and, more preferably, within a range of about 90 volts to about 264 volts. Furthermore, AC/DC rectifier 103 preferably accepts single phase, alternating current electrical power exhibiting frequencies within a range of about 40 Hertz to about 70 Hertz and, more preferably, within a range of about 47 Hertz to about 63 Hertz.

DC/DC converter 105 converts electrical power exhibiting a direct current, represented by an outlined arrow 119, to electrical power exhibiting direct current, represented by an outlined arrow 121, that exhibits characteristics, e.g., current, voltage, etc., appropriate for electrical energy storage unit management system 107. For example, in one particular embodiment, DC/DC converter 105 converts direct current electrical power to direct current electrical power exhibiting a voltage of about 28 volts. Direct current 121 is supplied to electrical energy storage unit management system 107 to recharge electrical energy storage unit 109. Moreover, DC/DC converter 105 senses and adapts to particular characteristics, such as voltage, current, and the like, of various types of direct current electrical power. Preferably, DC/DC converter 105 accepts direct current electrical power exhibiting voltages within a range of about 6 volts to about 50 volts and, more preferably, within a range of about 12 volts to about 28 volts.

In embodiments wherein electrical energy storage unit 109 comprises a plurality of batteries, e.g., a plurality of lithium-ion batteries, or a plurality of other such electrical energy storage devices, e.g., solid state, capacitive, electrical energy storage devices, it is desirable in certain implementations to charge the batteries or storage devices independently from one another. Accordingly, in certain embodiments, electrical energy storage system 101 comprises a plurality of AC/DC rectifiers 103 and/or a plurality of DC/DC converters 105 corresponding to the plurality of batteries or storage devices. Electrical energy storage unit management system 107 controls the operation of the plurality of AC/DC rectifiers and/or the plurality of DC/DC converters 105 to electrically charge the plurality of batteries or storage devices.

Electrical energy storage unit 109 provides direct current electrical power to one or more bi-directional adapters 111a and 111b via electrical energy storage unit management system 107. While the scope of the present invention is not so limited, electrical energy storage unit 109 preferably provides electrical power exhibiting a voltage within a range of about 18 volts to about 28 volts. Furthermore, it is preferable, but not required, that electrical energy storage unit 109 provides electrical power exhibiting a nominal voltage of about 25 volts. In one embodiment, electrical energy storage unit 109 exhibits a nominal capacity of at least two kilowatt-hours and, more preferably, more than about 2.25 kilowatt-hours. It is also preferable that electrical energy storage unit 109 retain at least about 80 percent of the nominal capacity of electrical energy storage unit 109 after 1200 discharge/recharge cycles. Moreover, it is preferable, but not required, that electrical energy storage system 101, including electrical energy storage unit 109, operate within a temperature range of about −40 degrees centigrade to about 70 degrees centigrade.

Figure 3:
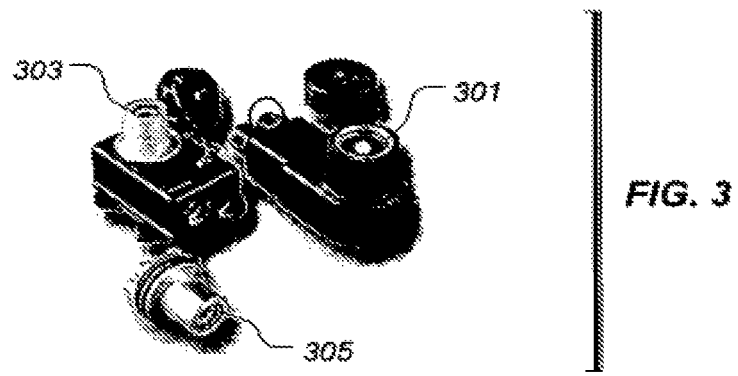
FIG. 3 is a perspective view of various embodiments of NATO slave connectors used in certain embodiments of the transportable electrical energy storage system of FIG. 1.

Still referring to FIG. 1, one or more bi-directional adapters 111a and 111b are operatively associated with electrical energy storage unit management system 107. It should be noted that, while two bi-directional adapters 111a and 111b are depicted in FIG. 1, the scope of the present invention is not so limited. Rather, electrical energy storage unit system 101 may comprise any desired, suitable number of bi-directional adapters, such as bi-directional adapters 111a and 111b. Bi-directional adapters 111a and 111b are ports for inputting and outputting electrical power, as represented by double-headed arrows 123 and 125. Electrical power is outputted through bi-directional adapters 111a and 111b from electrical energy storage unit 109 via electrical energy storage unit management system 107 to equipment operated by electrical power from electrical energy storage unit 109. Electrical power is inputted through bi-directional adapters 111a and 111b to electrical energy storage unit 109 via electrical energy storage unit management system 107 from sources producing electrical power having substantially the same characteristics as the electrical power stored in electrical energy storage unit 109. Preferably, one or more of bi-directional adapters 111a and 111b are configured as "NATO slave connectors," such as NATO slave connectors 301, 303, and 305, shown in FIG. 3. Connectors other than NATO slave connectors may be used instead of or in addition to bi-directional adapters 111a and 111b.

It should be noted that electrical energy storage unit 109, in any embodiment, may be recharged by any suitable, desired means for recharging electrical energy storage unit 109 via one or more AC/DC rectifiers 103, one or more DC/DC converters 105, and/or one or more bi-directional adapters 111a and 111b. Exemplary means for recharging electrical energy storage unit 109 include, but are not limited to, solar power generation devices, wind power generation devices, conventional AC power systems, fuel cells, and the like. Other means for recharging electrical energy storage unit 109, however, are contemplated by the present invention.

It is preferable, but not required, for electrical energy storage unit 109 to be capable of a maximum, continuous discharge rate of electrical power through one or more of bi-directional adapters 111a and 111b of at least two kilowatts at 200 amperes of current. Moreover, it is preferable, but not required, for electrical energy storage unit 109 to be capable of a maximum, peak discharge rate of electrical power through one or more of bi-directional adapters 111a and 111b of at least about 10 kilowatts at 500 amperes of current.

In some embodiments, electrical energy storage system 101 provides a plurality of electrical energy output modes. In such an embodiment, electrical energy storage unit management system 107 includes power electronics circuitry to provide electrical power from electrical energy storage unit 109 in a first, "lead-acid" mode, such that the voltage profile for the electrical energy outputted from electrical energy storage system 101 mimics the voltage profile of a lead-acid battery system, so that electrical energy storage unit 109 is inhibited from becoming inadvertently discharged. In one embodiment, electrical energy storage unit management system 107 outputs electrical energy exhibiting one or more voltages that substantially match the voltage of a lead-acid battery system to which electrical energy storage system 101 is connected. For example, if the lead-acid battery system to which electrical energy storage system 101 is connected is nominally a 24-volt system but exhibits a slightly different voltage, e.g., 24.4 volts, electrical energy storage unit management system 107 outputs electrical energy exhibiting a voltage of substantially 24.4 volts. Using the same example, if no voltage is detected at the lead-acid battery system by electrical energy storage unit management system 107, electrical energy storage unit management system 107 outputs electrical energy exhibiting a voltage of substantially 24.0 volts. In a second mode, electrical energy storage unit management system 107 outputs electrical energy from electrical energy storage unit 109 exhibiting the voltage characteristic of electrical energy storage unit 109, which is particularly useful in high power implementations, such as in jump-starting a vehicle.

Figure 4:
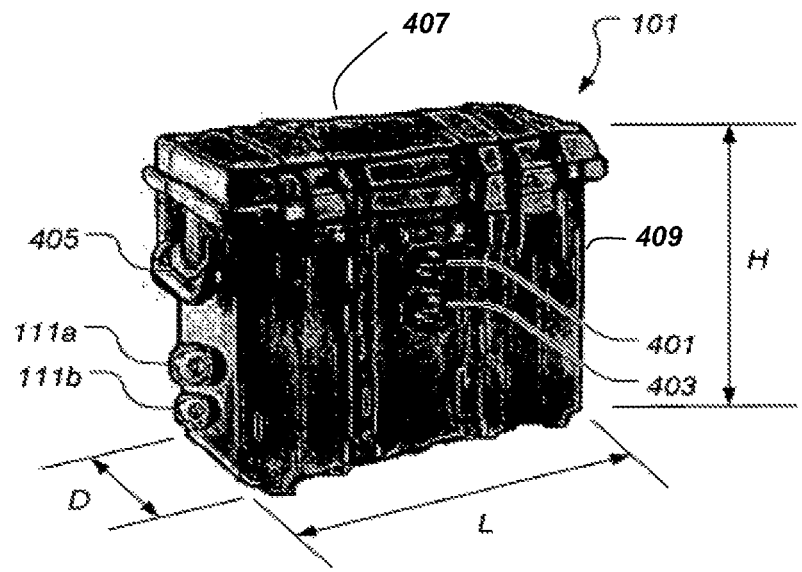
FIG. 4 is a stylized, perspective view of one particular embodiment of the transportable electrical energy storage system of FIG. 1.

As shown in the exemplary embodiment of electrical energy storage system 101 shown in FIG. 4, electrical energy storage system 101 includes one or more electrical connectors, such as a connector 401 of FIG. 4, for connecting an alternating current power source to AC/DC rectifier 103. Moreover, it should be noted that electrical energy storage system 101 includes one or more electrical connectors, such as a connector 403 of FIG. 4, for connecting a direct current power source to DC/DC converter 105. Particular embodiments of bi-directional adapters 111a and 111b are shown in FIG. 4.

Still referring to FIG. 4, electrical energy storage system 101 preferably includes at least two handles 405 (only one shown in FIG. 4) attached to case 113 for carrying electrical energy storage system 101. Case 113 preferably comprises one or more structural members that protect at least AC/DC rectifier 103, DC/DC converter 105, electrical energy storage unit management system 107, electrical energy storage 109, and bi-directional adapters 111a and 111b from damage by rough handling or dropping of electrical energy storage system 101. Moreover, case 113 is preferably substantially water resistant and is configured to protect the contents thereof from shock, vibration, and electromagnetic energy damage. In the illustrated embodiment, case 113 comprises a lid 407 hingedly attached to a body 409. Case 113 defines a cavity therein for housing at least AC/DC rectifier 103, DC/DC converter 105, electrical energy storage unit management system 107, electrical energy storage unit 109, and bi-directional adapters 111a and 111b. In one particular embodiment, case 113 has dimensions of about 45 centimeters in height (H), about 45 centimeters in length (L), and about 15 centimeters in depth (D).

Figure 5:
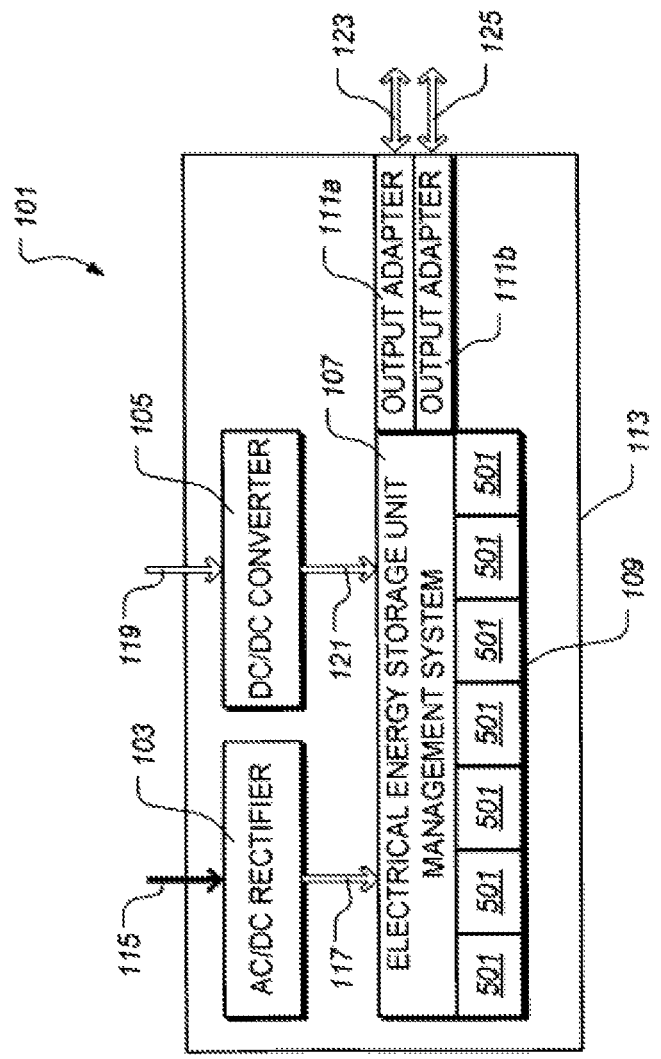
FIG. 5 is a stylized, block diagram of an illustrative embodiment of the transportable electrical energy storage system of FIG. 1 in which the electrical energy storage unit includes a plurality of removable electrical energy storage modules.

Electrical energy storage unit 109 may be electrically connected to electrical energy storage unit management system 107 in removable or non-removable fashions. For example, electrical energy storage unit 109 may be electrically "hard-wired" to electrical energy storage unit management system 107 or electrically connected to electrical energy storage unit management system 107 via connectors disposed within case that are not generally accessible to users of electrical energy storage system 101. In an alternative embodiment shown in FIG. 5, electrical energy storage unit 109 comprises one or more removable electrical energy storage modules 501 that are electrically connected with electrical energy storage unit management system 107. While a particular number of electrical energy storage modules 501 are depicted in FIG. 5, the scope of the present invention is not so limited. Rather, any desirable but suitable number of electrical energy storage modules 501 may be employed in electrical energy storage system 101.

Figure 6:
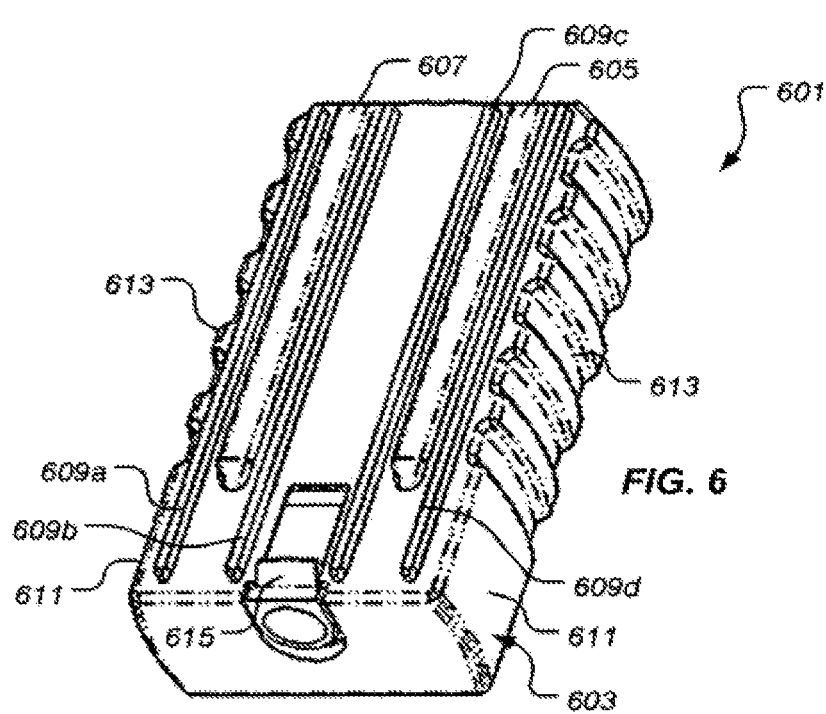
FIG. 6 is a perspective view of a first illustrative embodiment of an electrical energy storage module.
Figure 7:
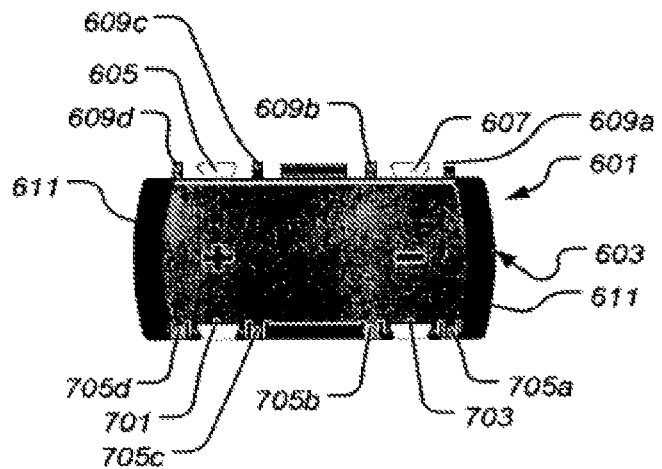
FIG. 7 is a first end, elevational view of the electrical energy storage module of FIG. 1.
Figure 8:
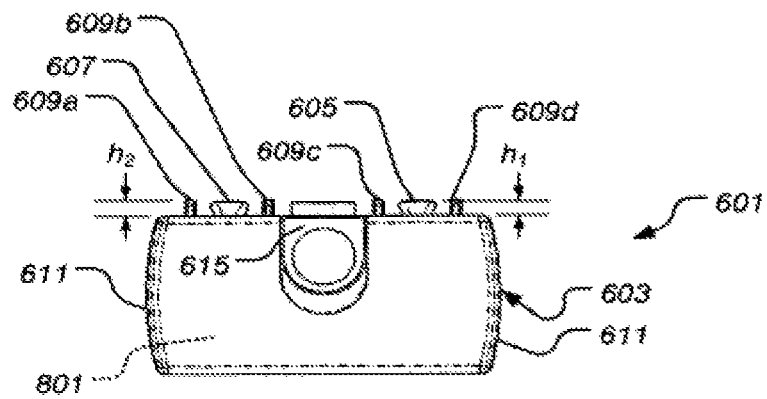
FIG. 8 is a second end, elevational view of the electrical energy storage module of FIG. 1.

While electrical energy storage module 501 may take on many different forms, FIGS. 6-8 depict a first illustrative embodiment of an electrical energy storage module 601. FIG. 6 depicts a perspective view of electrical energy storage module 601, while FIGS. 7 and 8 depict end views of electrical energy storage module 601.

Electrical energy storage module 601 comprises a shell or case 603 housing one or more electrical energy storage cells 801. Shell 603 comprises a substantially non-electrically conductive material, such as a polymeric material. While the present invention is not so limited, the one or more electrical energy storage cells 801 may be lithium-ion cells or solid state, capacitive energy storage devices, such as those described herein. In other embodiments, however, the one or more electrical energy storage cells 801 may be nickel-cadmium cells, nickel-metal hydride cells, lithium cells, lead-acid cells, or any other type of cell suitable for the particular implementation. Positive poles of the one or more electrical energy storage cells 801 are electrically connected to a male positive contact 605 and a female positive contact 701. Negative poles of the one or more electrical energy storage cells 801 are electrically connected to a male negative contact 607 and a female negative contact 703. Male positive contact 605 and male negative contact 607 extend from and are exposed from shell 603, while female positive contact 701 and female negative contact 703 are exposed from but recessed in shell 603. Contacts 605, 607, 701, and 703 comprise electrically conductive material, such as a copper alloy. It should be noted that male positive (or negative) contact is interchangeably used with positive (or negative) male contact and female positive (or negative) contact is interchangeably used with positive (or negative) female contact herein.

Contact 605 of electrical energy storage module 601 is configured to be received in contact 701 of a second electrical energy storage module 601 and contact 607 of electrical energy storage module 601 is configured to be received in contact 703 of the second electrical energy storage module 601. In other words, in the illustrated embodiment, female contacts 701 and 703 define grooves corresponding to the shapes of male contacts 605 and 607, respectively. Male contacts 605 and 607 and/or female contacts 701 and 703 are also configured to be mated with corresponding contacts of an electrical energy storage charger and of equipment or electrical energy storage adapters of equipment to be powered by electrical energy storage module 601, as is discussed in greater detail herein.

In a preferred embodiment, shell 603 defines ridges or protrusions 609a-609d that extend to a height above male positive contact 605 and male negative contact 607, which is best shown in FIG. 8. In other words, in the illustrated embodiment, male positive contact 605 and male negative contact 607 extend from case 603 to a height $h_1$ and protrusions extend to a height $h_2$, wherein $h_2$ is greater than $h_1$. Protrusions 609a-609d inhibit inadvertent contact with male positive contact 605 and female positive contact 607. Moreover protrusions 609a-609d act as positioning guides when electrically coupling a second electrical energy storage module 601 to electrical energy storage module 601, when electrically coupling electrical energy storage module 601 to a electrical energy storage charger, or when electrically coupling electrical energy storage module 601 to equipment or electrical energy storage adapters of equipment to be powered by electrical energy storage module 601. For example, case 603 defines grooves 705a-705d that are configured to receive projections 609a-609d, respectively, when electrical energy storage module 601 is mated with a second electrical energy storage module 601, with an electrical energy storage charger, and/or with equipment or electrical energy storage adapters of equipment to be powered by electrical energy storage module 601. Sides 611 of case 603 also preferably define one or more grips 613 to aid in handling electrical energy storage module 601.

A plurality of electrical energy storage modules 601 may be electrically coupled with one another. It may be advantageous in certain situations for a plurality of electrical energy storage modules to be electrically coupled with one another depending upon how long a user will need electrical power. For example, if electrical power will be needed for only a few minutes, a single electrical energy storage module 601 can be used. However, if electrical power is needed for an hour or more, a plurality of electrical energy storage modules 601 can be electrically coupled with one another. It should be noted that, in some embodiments, separate electrical energy storage modules 601 are interfaced with electrical energy storage unit management system 107 and, in other embodiments, one electrical energy storage module 601 is interfaced with electrical energy storage unit management system 107 and with the other electrical energy storage module or modules 601.

Figure 9:
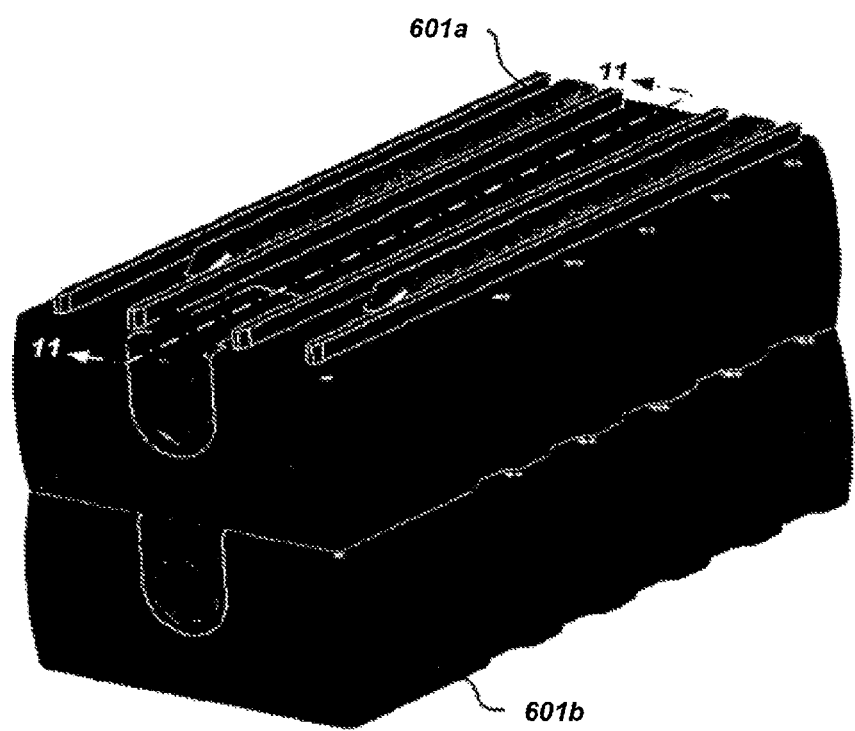
FIG. 9 is a perspective view of a plurality of electrically-coupled electrical energy storage modules.
Figure 10:
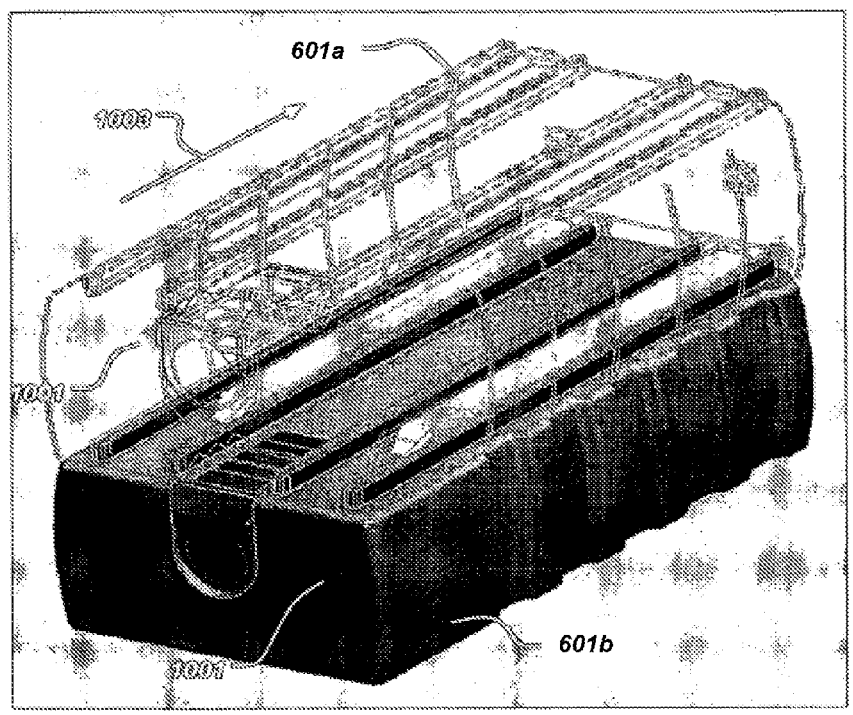
FIG. 10 is a perspective view of the plurality of electrically-coupled electrical energy storage modules corresponding to the view of FIG. 9, wherein a first electrical energy storage module is shown in a transparent fashion to better reveal in interconnection between the electrical energy storage modules.

FIGS. 9 and 10 depict a first electrical energy storage module 601a electrically coupled with a second electrical energy storage module 601b. It should be noted that the element numbers "601a" and "601b" are used merely to indicate a first electrical energy storage module and a second electrical energy storage module that each have a configuration and construction corresponding to electrical energy storage module 601 of FIGS. 6-8. Both FIG. 9 and FIG. 10 are perspective views of electrical energy storage modules 601a and 601b. In FIG. 10, however, electrical energy storage module 601a is illustrated in a transparent fashion to better illustrate the interconnection between electrical energy storage module 601a and electrical energy storage module 601b.

To electrically couple first electrical energy storage module 601a with second electrical energy storage module 601b, protrusions 609a-609d of second electrical energy storage module 601b are mated with grooves 705a-705d, respectively, of first electrical energy storage module 601a with an end 1001 of first electrical energy storage module 601a extending beyond end 1001 of second electrical energy storage module 601b. First electrical energy storage module 601a is then urged in a direction generally corresponding to an arrow 1003, wherein ends 1001 of first electrical energy storage module 601a and second electrical energy storage module 601b are generally aligned.

Figure 11:
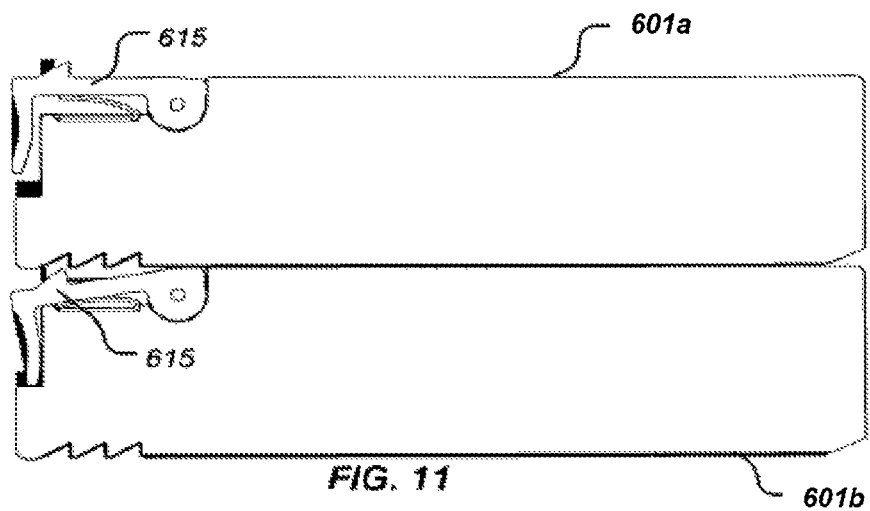
FIG. 11 is a cross-sectional view of the plurality of electrical energy storage modules of FIG. 4 taken along the line 11-11 in FIG. 9.
Figure 12:
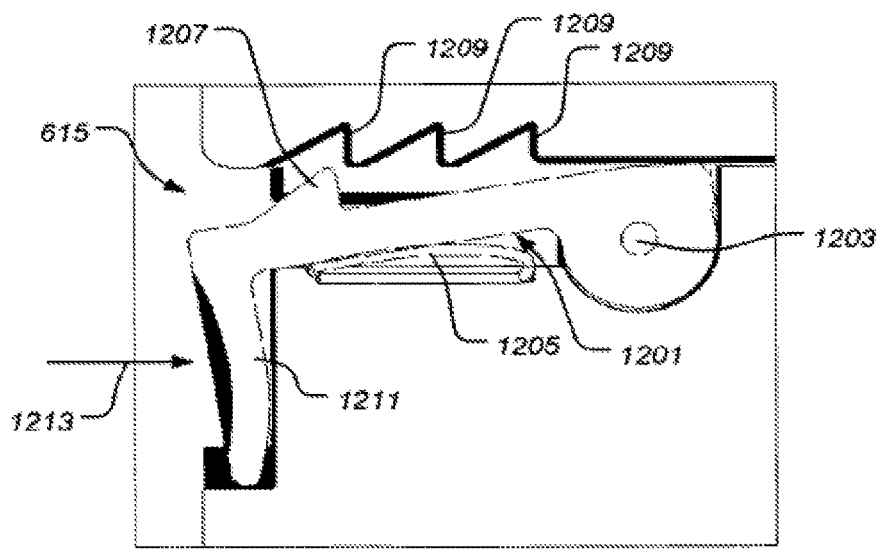
FIG. 12 is an enlarged view of portions of the electrical energy storage modules of FIG. 6 to better illustrate a latching mechanism of the electrical energy storage modules.

Electrical energy storage module 601 further comprises a latch mechanism 615 that is operable to inhibit first electrical energy storage module 601a from becoming electrically decoupled from second electrical energy storage module 601b, from a electrical energy storage charger, and/or from equipment or electrical energy storage adapters of equipment to be powered by electrical energy storage module 601. Latch mechanism 615 is best shown in FIGS. 11 and 12. FIG. 11 is a stylized, cross-sectional view of electrical energy storage modules 601a and 601b taken along the line 11-11 in FIG. 9. FIG. 12 is an enlarged view of portions of electrical energy storage modules 601a and 601b proximate latch mechanism 615 of electrical energy storage module 601b.

In the illustrated embodiment, latch mechanism 615 comprises a latch 1201 hingedly attached to case 603 of second electrical energy storage module 601b by a pin 1203. Biasing element 1205 biases latch 1201 into latched configuration, such that a barb 1207 is engaged with a notch 1209 of case 603 of electrical energy storage module 601a when electrical energy storage module 601a is electrically coupled with electrical energy storage module 601b. Note that latch 1201 is shown in FIGS. 11 and 12 in an unlatched configuration, such that barb 1207 is withdrawn from notch 1209. Latch 1201 is placed in the unlatched configuration by pressing on tab 1211 of latch 1201, generally in a direction corresponding to an arrow 1213, to overcome the biasing force of biasing element 1205 and rotate latch 1201 about pin 1203. When in the latched configuration, latch 1201 inhibits electrical energy storage module 601a from being removed from electrical energy storage module 601b. Pressing tab 1211 of latch 1201 allows electrical energy storage module 601a to be removed from electrical energy storage module 601b by sliding electrical energy storage module 601a in a direction generally counter to the direction of arrow 1003 (shown in FIG. 10) with respect to electrical energy storage module 601b.

Figure 13:
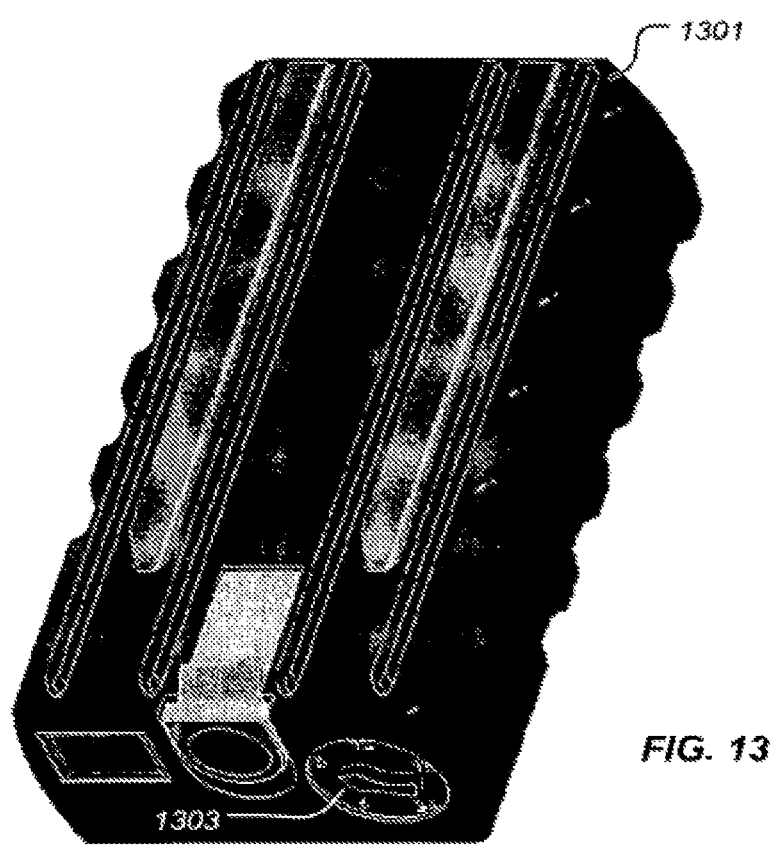
FIG. 13 is a perspective view of a second illustrative embodiment of an electrical energy storage module.

FIG. 13 depicts a second illustrative embodiment of an electrical energy storage module 1301. Electrical energy storage module 1301 includes the elements and construction of electrical energy storage module 601 except that the electrical voltage supplied by electrical energy storage module 1301 can be selected via a switch 1303. Switch 1303 operates an electrical transformer circuit (not shown) that converts the electrical energy supplied by electrical energy storage module 1301 from a voltage normally existing at the positive and negative poles of the one or more electrical energy storage cells 801 (shown in FIG. 8) to a desired voltage. In the illustrated embodiment, particular voltages of six volts, nine volts, 12 volts, 18 volts, and 24 volts can be selected by switch 1303. The scope of the present invention, however, is not so limited. Rather, the present invention contemplates other voltages that can be selected by switch 1303.

Figure 14:
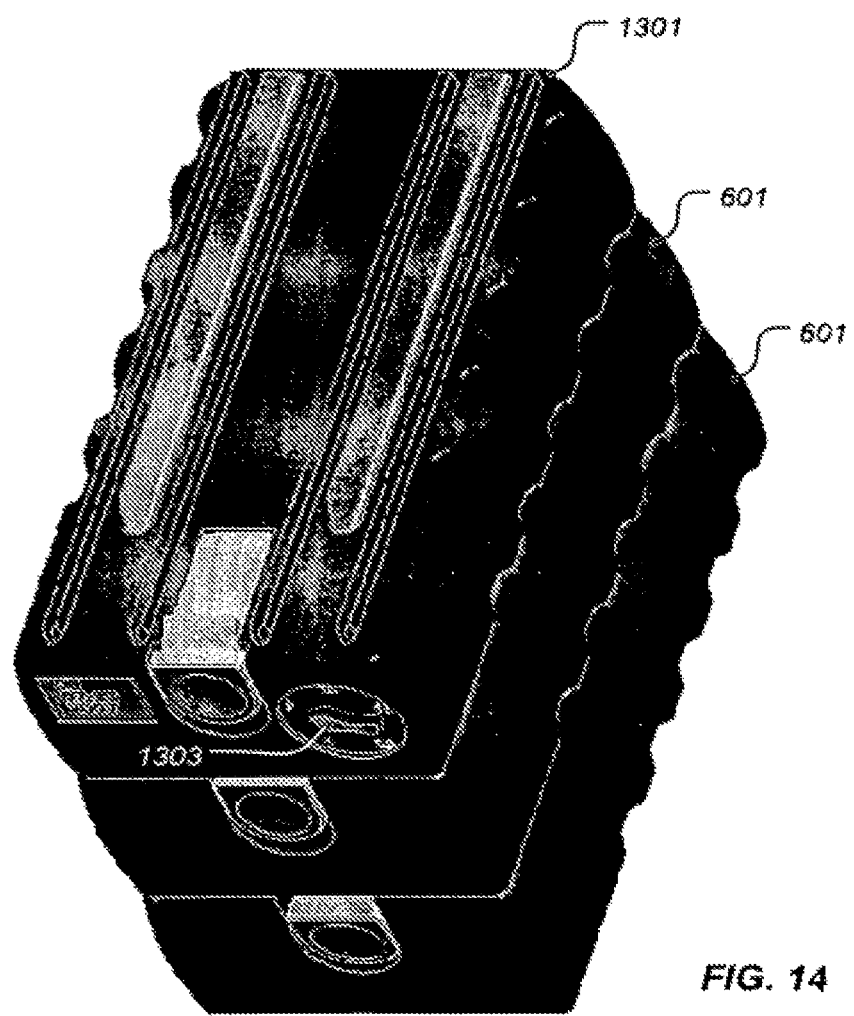
FIG. 14 is a perspective view of the electrical energy storage module of FIG. 13 electrically coupled with a plurality of electrical energy storage modules of FIG. 6.

It should be noted that one or more electrical energy storage modules 601 may be electrically coupled with electrical energy storage module 1301, as shown in FIG. 14, such that electrical energy storage module 1301 is directly electrically coupled with equipment or electrical energy storage adapters of equipment to be powered by electrical energy storage module 1301 and the one or more electrical energy storage modules 601. In the configuration shown in FIG. 14, electrical energy storage module 1301 converts the electrical energy provided by electrical energy storage module 1301 and the one or more electrical energy storage modules 601 to the desired voltage, as selected by switch 1303. In one embodiment, electrical energy storage modules 601 and 1301 include circuitry to manage the discharge of electrical energy storage modules 601 and 1301. In another embodiment, only electrical energy storage module 1301 includes circuitry to manage the discharge of electrical energy storage module 1301 and one or more electrical energy storage modules 601 electrically coupled with electrical energy storage module 1301.

Figure 15:
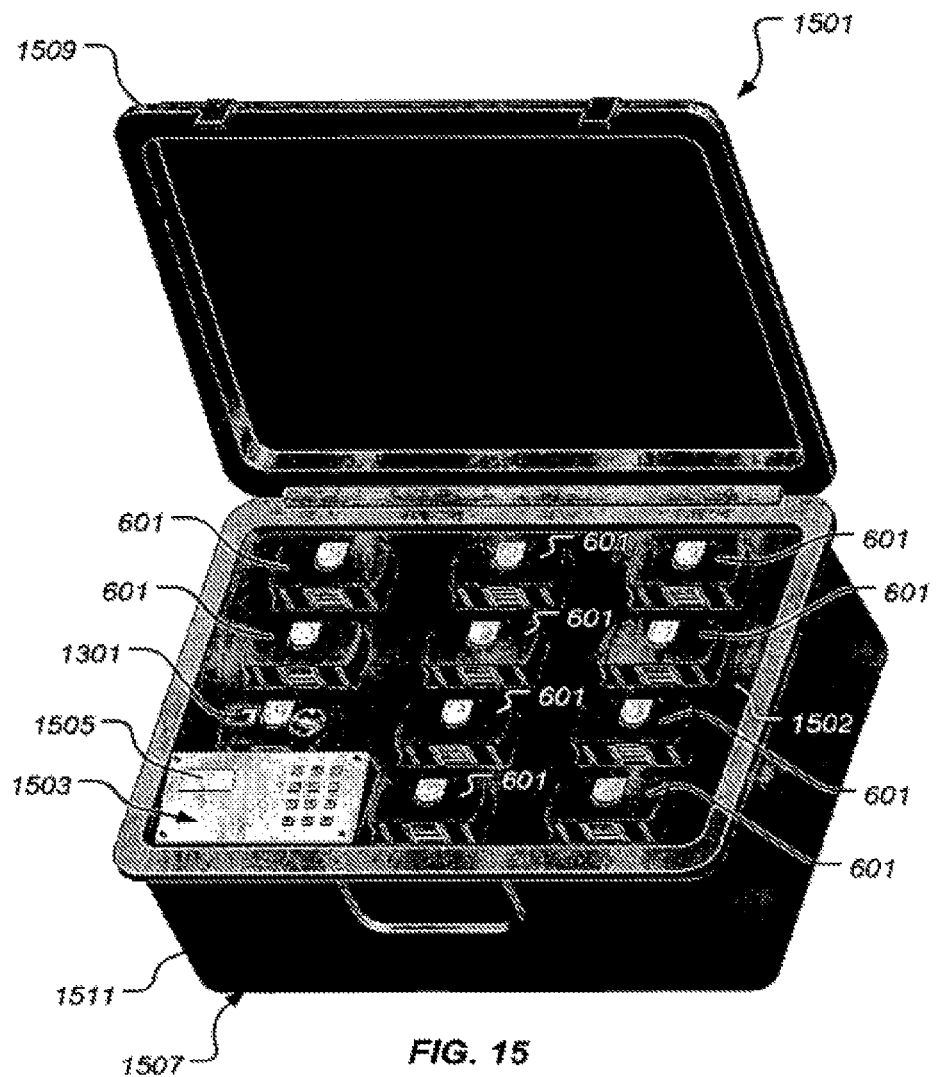
FIGS. 15 and 16 are perspective views of a charging device along with the electrical energy storage modules of FIGS. 6 and 13.
Figure 16:
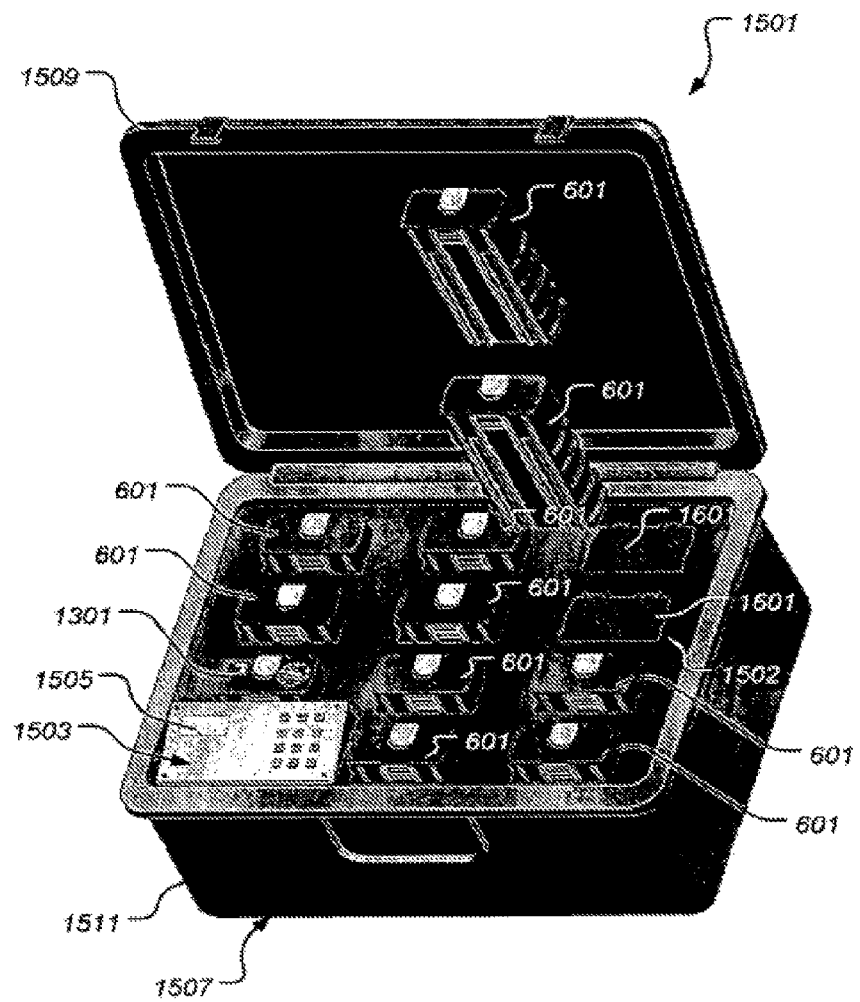
Figure 17:
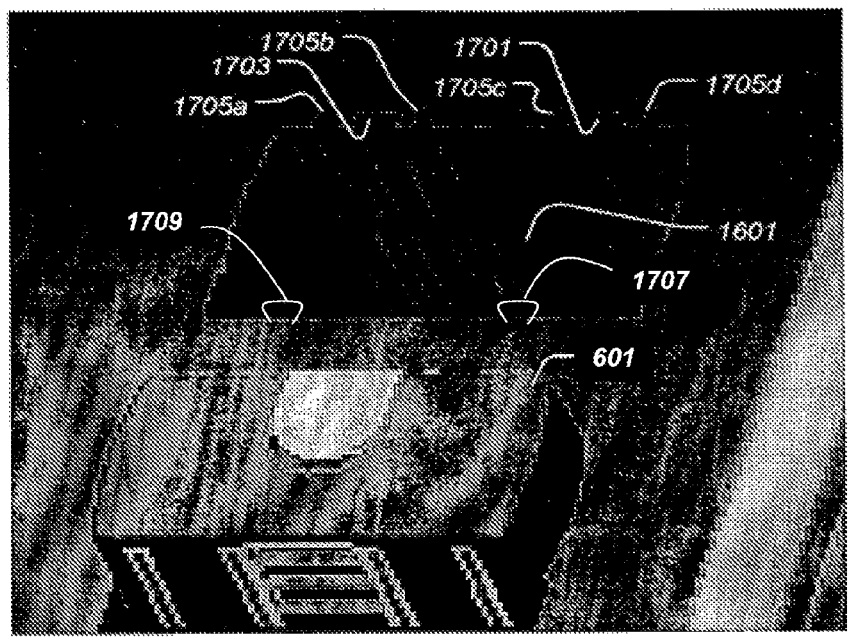
FIG. 17 is an enlarged, perspective view of a portion of the charging device shown in FIG. 16.

FIGS. 15-17 depict a charging device 1501 for battery modules 601 and/or 1301. As best shown in FIG. 16, charging device 1501 comprises an insert 1502 defining at least one cavity 1601 that is configured to receive one battery module 601 or one battery module 1301. In the illustrated embodiment, best shown in FIG. 17, a positive female contact 1701 and a negative female contact 1703, corresponding to and capable of mating with male positive contact 605 and male negative contact 607 of battery modules 601 and 1301, respectively, are exposed into each cavity 1601 (e.g., a first side thereof). Moreover, grooves 1705a-1705d, corresponding to protrusions 609a-609d of battery modules 601 and 1301, extend from cavity 1601. Preferably, one or more notches, corresponding to notches 1209 of battery modules 601 and 1301, extend from cavity 1601. When either battery module 601 or battery module 1301 is placed into cavity 1601, protrusions 609a-609d of battery module 601 or 1301 are received by grooves 1705a-1705d, respectively. Electrical contacts 605 and 607 of battery module 601 or 1301 are placed into electrical contact with electrical contacts 1701 and 1703, respectively. It should be noted that charging device 1501 may interface with female positive and negative contacts 701 and 703 of electrical energy storage modules 601 and 1301 by way of male positive and negative contacts 1707 and 1709 exposed in a second side of the cavity 1601. In some embodiments, latching mechanism 615 inhibits electrical energy storage module 601 or 1301 from being removed from cavity 1601 until such time tab 1211 (shown in FIG. 12) is pressed, thus allowing electrical energy storage module 601 or 1301 to be removed from cavity 1601.

Figure 18:
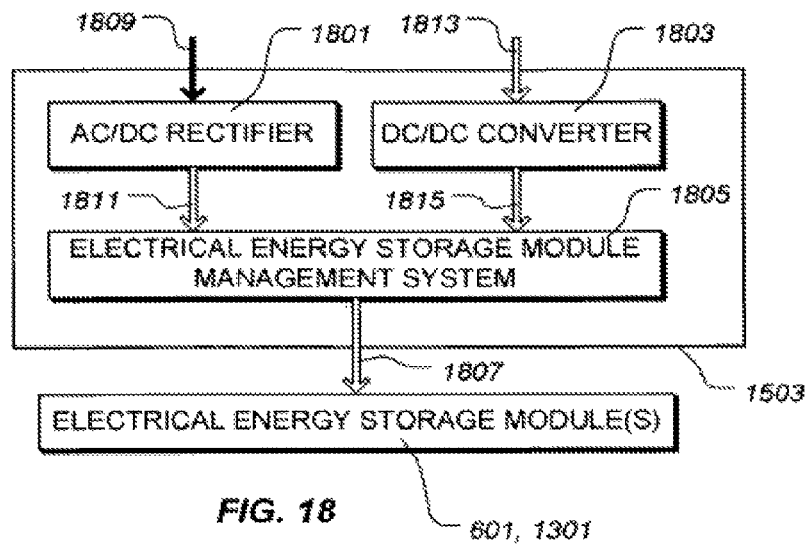
FIG. 18 is a stylized, block diagram of an illustrative embodiment of an electrical energy storage unit charging and management system.

Charging device 1501 further comprises an electrical energy storage module charging and management system 1503 for monitoring the electrical charge of electrical energy storage modules 601 and/or 1301 and for charging electrical energy storage modules 1601 and/or 1301. It should be noted that one or more electrical energy storage modules 601 and/or 1301 can be charged by charging device 1501. FIG. 18 is a block diagram depicting one particular, illustrative embodiment of charging device 1501. Electrical energy storage module charging and management system 1503 includes an AC/DC rectifier 1801, a DC/DC converter 1803, and an electrical energy storage unit management system 1805. Electrical energy storage unit management system 1805 is electrically coupled with one or more electrical energy storage modules 601 and/or 1301 via electrical contacts 605, 607, 701, 703 (represented in FIG. 18 by an arrow 1807) to electrically recharge the one or more electrical energy storage modules 601 and/or 1301 using electrical power from AC/DC rectifier 1801 or DC/DC converter 1803.

AC/DC rectifier 1801 rectifies electrical power exhibiting an alternating current, represented by a solid arrow 1809, to electrical power exhibiting direct current, represented by an outlined arrow 1811, that exhibits characteristics, e.g., current, voltage, etc. appropriate for electrical energy storage unit management system 1805. For example, one particular embodiment of AC/DC rectifier 1801 converts alternating current electrical power to direct current electrical power exhibiting a voltage of about 24 volts and has a power capacity of about two kilowatts. Direct current 1811 is supplied to electrical energy storage unit management system 1805 to recharge electrical energy storage modules 601 and/or 1301. Moreover, AC/DC rectifier 1801 senses and adapts to particular characteristics, such as voltage, frequency, current, and the like, of various types of alternating current electrical power. Preferably, AC/DC rectifier 1801 accepts single phase, alternating current electrical power exhibiting voltages within a range of about 50 volts to about 300 volts and, more preferably, within a range of about 90 volts to about 264 volts. Furthermore, AC/DC rectifier 1801 preferably accepts single phase, alternating current electrical power exhibiting frequencies within a range of about 40 Hertz to about 70 Hertz and, more preferably, within a range of about 47 Hertz to about 63 Hertz.

Still referring to FIG. 18, DC/DC converter 1803 converts electrical power exhibiting a direct current, represented by an outlined arrow 1813, to electrical power exhibiting direct current, represented by an outlined arrow 1815, that exhibits characteristics, e.g., current, voltage, etc., appropriate for electrical energy storage unit management system 1805. For example, in one particular embodiment, DC/DC converter 1803 converts direct current electrical power to direct current electrical power exhibiting a voltage of about 28 volts. Direct current 1815 is supplied to electrical energy storage unit management system 1805 to recharge electrical energy storage modules 601 and/or 1301. Moreover, DC/DC converter 1803 senses and adapts to particular characteristics, such as voltage, current, and the like, of various types of direct current electrical power. Preferably, DC/DC converter 1803 accepts direct current electrical power exhibiting voltages within a range of about 6 volts to about 50 volts and, more preferably, within a range of about 17 volts to about 28 volts.

It is also desirable for charging device 1501 to include an electric charge level indicator, such as a charge level indicator 1505 shown in FIGS. 15 and 16 to indicate the level of electrical charge remaining in electrical energy storage modules 601 and/or 1301.

Referring again to FIGS. 15 and 16, charging device 1501 preferably includes a case 1507 for carrying electrical energy storage module charging and management system 1503 and electrical energy storage modules 601 and/or 1301. Case 1507 preferably comprises one or more structural members that protect at least AC/DC rectifier 1801, DC/DC converter 1803, electrical energy storage unit management system 1805, and electrical energy storage modules 601 and/or 1301 from damage by rough handling or dropping of charging device 1501. Moreover, case 1507 is preferably substantially water resistant and is configured to protect the contents thereof from shock, vibration, and electromagnetic energy damage. In the illustrated embodiment, case 1507 comprises a lid 1509 hingedly attached to a body 1511. Case 1507 defines a cavity therein for housing at least AC/DC rectifier 1801, DC/DC converter 1803, electrical energy storage unit management system 1805, and electrical energy storage modules 601 and/or 1301.

Figure 19:
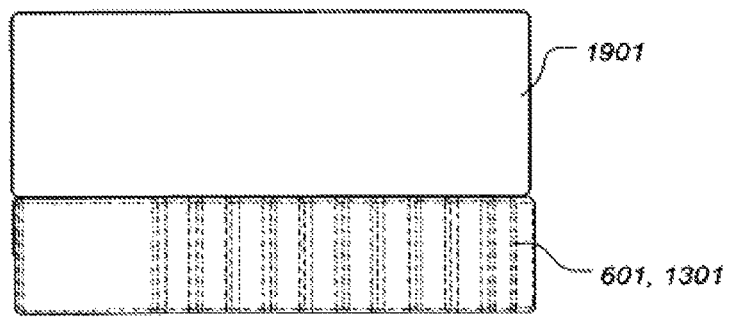
FIG. 19 is a stylized, side, elevational view of an electrical energy storage module electrically coupled with an article of equipment.

Referring now to FIG. 19, electrical energy storage module 601 or 1301 may be directly electrically coupled with equipment 1901 to which electrical energy storage module 601 or 1301 provides electrical power. It should be noted that one or more additional electrical energy storage modules 601 may be electrically coupled with electrical energy storage module 601 or 1301 that is directly electrically coupled with equipment 1901, such as shown in FIGS. 9 and 14.

Figure 20:
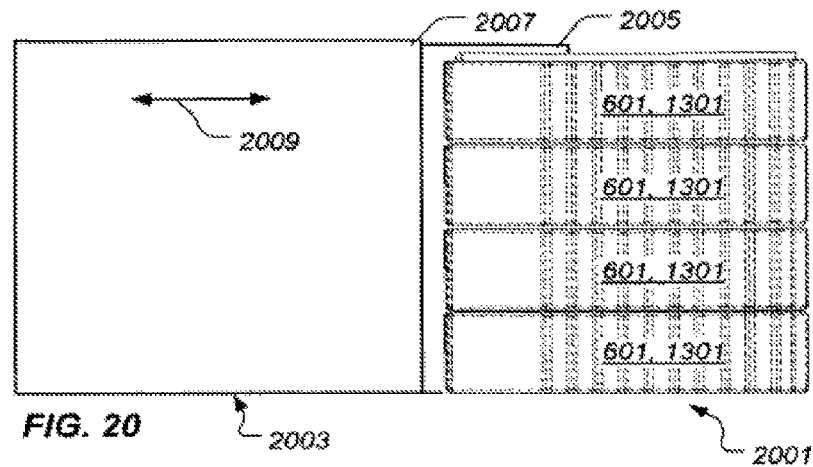
FIGS. 20 and 21 are stylized, side, elevational views of particular implementations of the transportable electrical energy storage system of FIG. 1.
Figure 21:
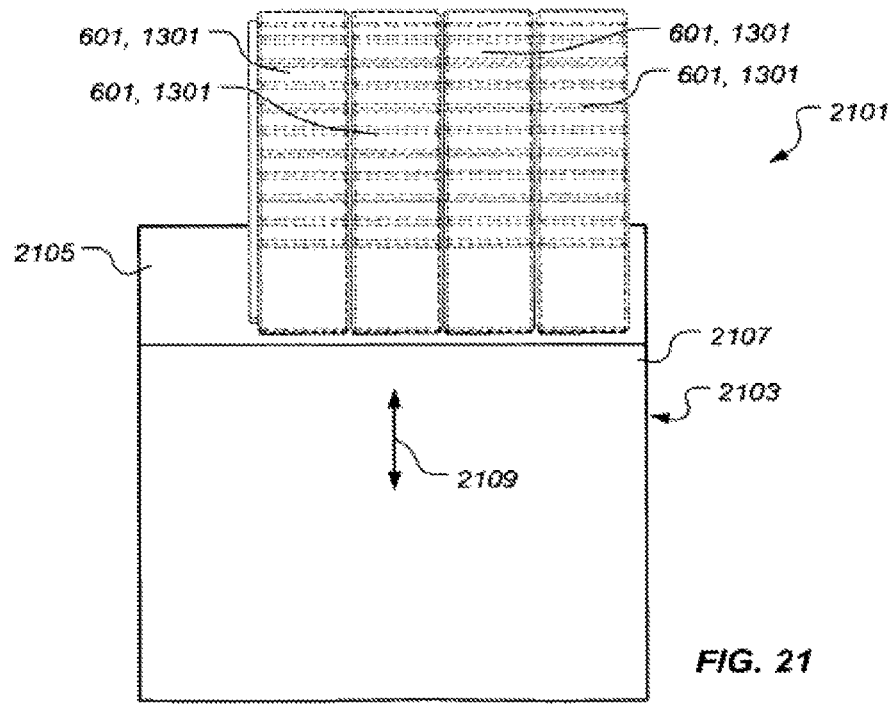

FIGS. 20 and 21 depict two particular illustrative embodiments of an electrical energy storage system, such as electrical energy storage system 101. Referring to the embodiment of FIG. 20, an electrical energy storage system 2001 is configured such that electrical energy storage modules 601 and/or 1301 are inserted into and withdrawn from a case 2003 through an opening revealed by a lid 2005 in an end 2007 of case 2003. In other words, electrical energy storage modules 601 and/or 1301 are inserted into and withdrawn from case 2003 in a generally horizontal motion, as indicated by a double-headed arrow 2009. In the embodiment of FIG. 21, an electrical energy storage system 2101 is configured such that electrical energy storage modules 601 and/or 1301 are inserted into and withdrawn from a case 2103 through an opening revealed by a lid 2105 in a top 2107 of case 2103. In other words, electrical energy storage modules 601 and/or 1301 are inserted and withdrawn from case 2103 in generally a vertical motion, as indicated by a double-headed arrow 2109. It should be noted that cases 2003 and 2103 generally correspond to case 113 of FIG. 1.

Figure 22:
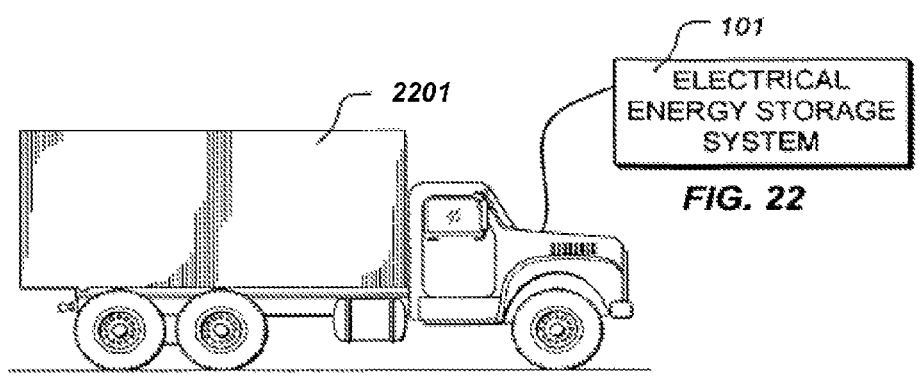
FIG. 22 is a stylized view of the transportable electrical energy storage system of FIG. 1 electrically coupled with a vehicle.

Referring now to FIG. 22, transportable electrical energy storage system 101 is capable of jumpstarting a vehicle 2201, such as a military or civilian vehicle, by connecting one of bi-directional adapters 111*a* or 111*b* (shown in FIGS. 1 and 4) to a corresponding electrical connection of the vehicle, e.g., vehicle 2201, to be jumpstarted. It should be noted that electrical energy storage systems 2001 and 2101 can be used in the same ways as described herein with respect to electrical energy storage system 101. Electrical energy storage system 101 is capable of recharging one or more batteries of vehicle 2201, such as a military or civilian vehicle, by connecting one of bi-directional adapters 111*a* or 111*b* to the corresponding electrical connection of the vehicle, e.g., vehicle 2201, having the battery or batteries in need of recharging.

Figure 23:
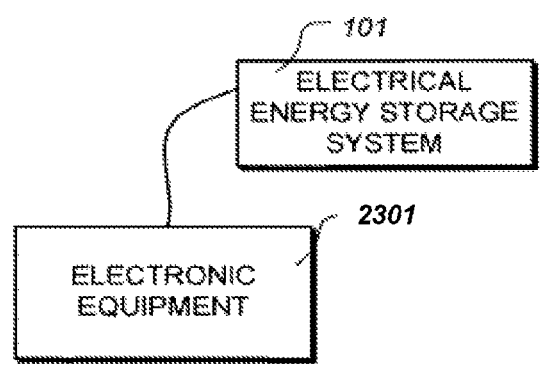
FIG. 23 is a block diagram illustrating the transportable electrical energy storage system of FIG. 1 electrically coupled with electronic equipment.

Furthermore, as shown in FIG. 23, electrical energy storage system 101 is capable of powering electronic equipment, such as electronic equipment 2301, having electrical power requirements corresponding to the electrical power characteristics of electrical energy storage modules 601 and/or 1301 by electrically coupling one of bi-directional adapters 111*a* or 111*b* to the corresponding electrical connection of the electronic equipment 2301 to be powered. In one particular implementation, electrical energy storage system 101 is adapted to power military electronic equipment 2301 requiring standard, 28 volt direct current electrical power.

As shown in FIG. 24, a plurality of electrical energy storage systems 101, indicated in FIG. 24 as electrical energy storage systems 101a, 101b, and 101c, may be interconnected to provide power to equipment, such as vehicle 2201 or electronic equipment 2301 (shown in FIG. 23). Electrical energy storage system 101a is interconnected with electrical energy storage system 101b by electrically coupling one of bi-directional adapters 111a or 111b, shown in FIGS. 1 and 4, of electrical energy storage system 101a with one of bi-directional adapters 111a or 111b of electrical energy storage system 101b. Electrical energy storage system 101b is interconnected with electrical energy storage system 101c by electrically coupling one of bi-directional adapters 111a or 111b of electrical energy storage system 101b with one of bi-directional adapters 111a or 111b of electrical energy storage system 101c. Electrical energy storage system 101c is connected to vehicle 2201 by connecting one of bi-directional adapters 111a or 111b of electrical energy storage system 101c to a corresponding electrical connection of vehicle 2201. It should be noted that any number of electrical energy storage systems 101 may be so interconnected. The interconnection of multiple electrical energy storage systems 101 is particularly useful when higher power or increased energy storage, i.e., greater effective use time, is needed.

It is also desirable for electrical energy storage system 101 to include an electric charge level indicator, such as a charge level indicator 2501 shown in FIG. 25 or a charge level indicator 2601 of FIG. 26, to indicate the level of electrical charge remaining in electrical energy storage unit 109 (shown in FIG. 1). Charge level indicator 2501 indicates a charge level of electrical energy storage unit 109 via a movable needle 2503 positioned over a fixed gage 2505. Charge level indicator 2601 indicates a charge level of electrical energy storage unit 109 via a plurality of indicator lamps 2603, such as light emitting diodes. Fewer illuminated lamps 2603 indicate a lower charge level, while a greater number of illuminated lamps 2603 indicate a higher charge level.

Figure 27:
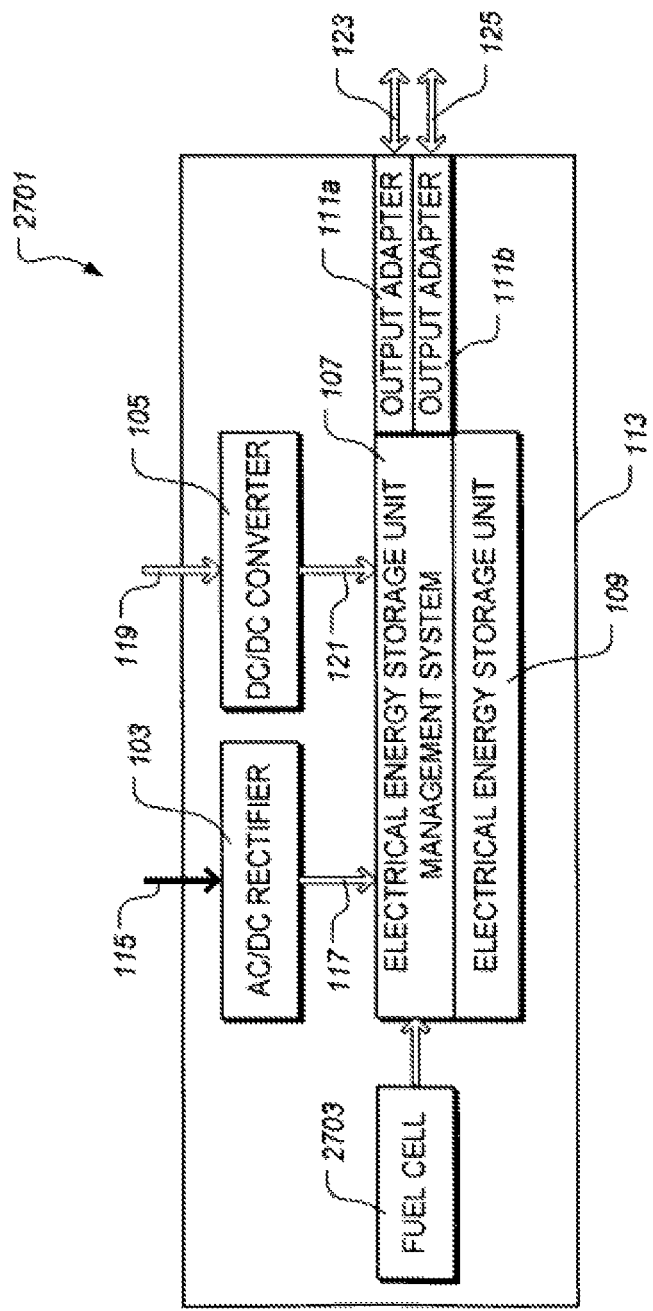
FIG. 27 is a stylized, block diagram of an illustrative embodiment of a transportable electrical energy storage system including a fuel cell for recharging the transportable electrical energy storage system.

FIG. 27 depicts an illustrative embodiment of electrical energy storage system 2701 that further includes a fuel cell 2703 for recharging electrical energy storage unit 109. Other elements of electrical energy storage system 2701 correspond to the elements of electrical energy storage system 101 of FIG. 1.

Figure 28:
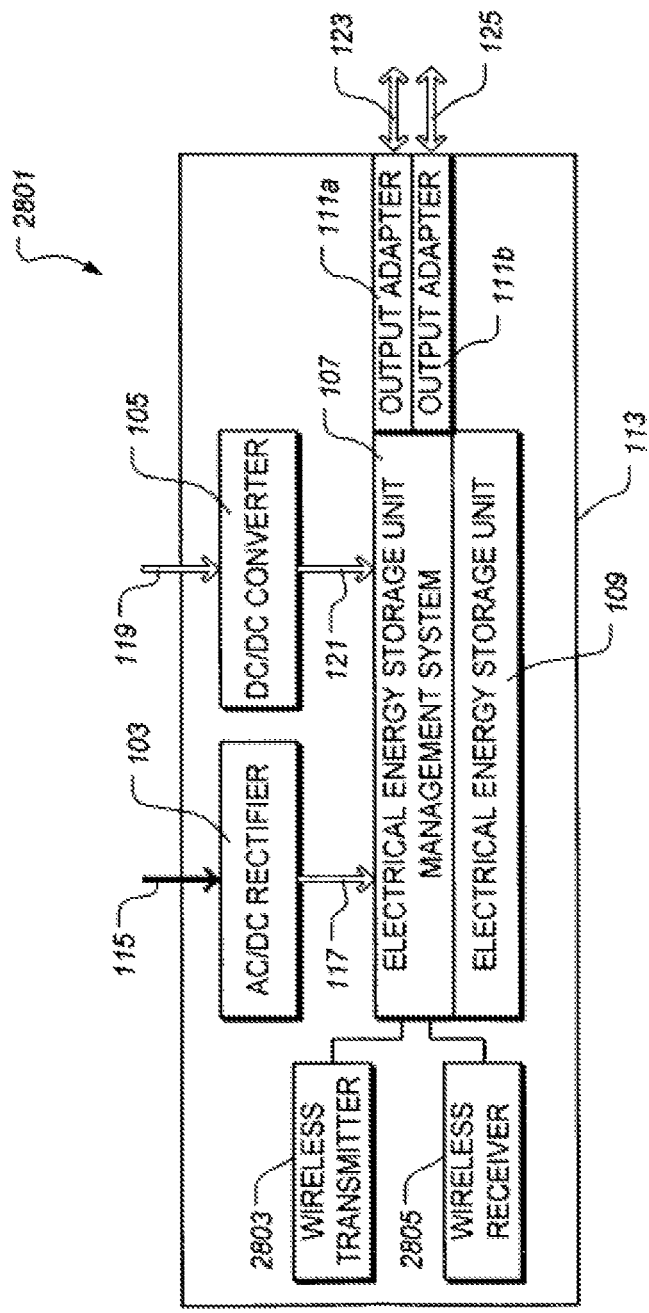
FIG. 28 is a stylized, block diagram of an illustrative embodiment of a transportable electrical energy storage system including a wireless transmitter for transmitting the health and/or charge condition of the transportable electrical energy storage system.

FIG. 28 depicts an illustrative embodiment of electrical energy storage system 2801 that further includes a wireless transmitter 2803 for reporting the health and/or charge condition of electrical energy storage system 2801 via radio frequency transmissions. In certain embodiments, electrical energy storage system 2801 includes a wireless receiver 2805 for receiving instructions to control electrical energy storage system 2801, such as turning electrical energy storage system 2801 on or off, or the like. Other elements of electrical energy storage system 2801 correspond to the elements of electrical energy storage system 101 of FIG. 1.

It should be noted that charging device 1501 (shown in FIG. 15) may also include a fuel cell, such as fuel cell 2703 (shown in FIG. 27) for recharging one or more electrical energy storage modules 601 or 1301; a wireless transmitter, such as wireless transmitter 2803 (shown in FIG. 28) for reporting the health of charging device 1501 and/or the charge condition of electrical energy storage modules 601 and/or 1301 via radio frequency transmissions; and/or a wireless receiver, such as wireless receiver 2805 (shown in FIG. 28) for receiving instructions to control charging device 1501.

Electrical energy storage system 101 provides significant advantages that include, but are not limited to (1) providing a quiet, transportable means for jumpstarting a vehicle; (2) providing a quiet, transportable means for recharging a battery of a vehicle; (3) providing a quiet, transportable means for powering electronic equipment; and (4) providing a quiet means of providing electrical power that can be hand carried by personnel. Electrical energy storage modules 101 and/or 801 provide significant advantages that include, but are not limited to the ability for a user to scale the available electrical power provided by batteries to meet needs.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below. It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. An electrical energy storage module charging device, comprising:
    an electrical energy storage module charging and management system configured to receive electrical power from an external source;
    an insert defining at least one cavity;
    a positive female contact exposed into a first side of the cavity;
    a negative female contact exposed into the first side of the cavity;
    a positive male contact exposed into a second side of the cavity; and
    a negative male contact exposed into the second side of the cavity;
    wherein the contacts are electrically coupled with the electrical energy storage module charging and management system; and
    wherein the contacts are configured to mate with corresponding contacts of an electrical energy storage module.

2. The electrical energy storage module charging device of claim 1, further comprising:
    an AC/DC rectifier operably associated with the electrical energy storage module management system; and
    a DC/DC converter operably associated with the electrical energy storage module management system.

3. The electrical energy storage module charging device of claim 1, further comprising:
    grooves extending from the at least one cavity for receiving corresponding protrusions of the electrical energy storage module.

4. The electrical energy storage module charging device of claim 1, further comprising:
    protrusions extending into the at least one cavity for reception in corresponding grooves of the electrical energy storage module.

* * * * *